(12) United States Patent
Mann et al.

(10) Patent No.: US 7,978,336 B2
(45) Date of Patent: Jul. 12, 2011

(54) THREE WAVELENGTH QUANTITATIVE IMAGING SYSTEMS

(75) Inventors: Christopher J. Mann, Knoxville, TN (US); Philip R. Bingham, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 249 days.

(21) Appl. No.: 12/381,758

(22) Filed: Mar. 16, 2009

(65) Prior Publication Data

US 2010/0231918 A1 Sep. 16, 2010

(51) Int. Cl.
- G01B 9/02 (2006.01)
- G01B 11/02 (2006.01)
- G01N 21/41 (2006.01)
- G01N 21/43 (2006.01)

(52) U.S. Cl. ......... 356/485; 356/498; 356/503; 356/517

(58) Field of Classification Search .................. 356/457, 356/458, 484–486, 496, 498, 503, 504, 517
See application file for complete search history.

(56) References Cited

U.S. PATENT DOCUMENTS

| | | | |
|---|---|---|---|
| 4,701,006 A | 10/1987 | Perlmutter | |
| 6,760,134 B1 * | 7/2004 | Schilling et al. | 359/10 |
| 6,809,845 B1 * | 10/2004 | Kim et al. | 359/9 |
| 6,943,924 B2 | 9/2005 | Marquet et al. | |
| 7,127,109 B1 | 10/2006 | Kim | |
| 7,312,875 B2 * | 12/2007 | Hanson et al. | 356/484 |
| 7,364,296 B2 * | 4/2008 | Miller et al. | 351/206 |

OTHER PUBLICATIONS

Yamaguchi, Ichirou et al. "Phase-shifting color digital holography". Optics Letters, vol. 27, No. 13, Jul. 1, 2002, pp. 1108-1110.*

Bachim, B. L. et al., "Microinterferometric optical phase tomography for measuring small, asymmetric refractive-index differences in the profiles of optical fibers and fiber devices," Applied Optics, vol. 44, No. 3, 2005, pp. 316-327.

Beuthan, J. et al., "The spatial variation of the refractive index in biological cells," Phys. Med. Biol., vol. 41, 1996, pp. 369-382.

Charrière, F. et al., "Living specimen tomography by digital holographic microscopy: morphometry of Testate amoeba," Optics Express, vol. 14, No. 16, 2006, pp. 7005-7013.

Choi, W. et al., "Extended depth of focus in tomographic phase microscopy using a propogation algorithm," Optics Letters, vol. 33, No. 2, 2008, pp. 171-173.

Cuche, E. et al., "Digital holography for quantitative phase-contrast imaging," Optics Letters, vol. 24, No. 5, 1999, pp. 291-293.

Ferraro, P. et al., "Quantitative phase-contrast microscopy by a lateral shear approach to digital holographic image reconstruction," Optics Letters, vol. 31, No. 10, 2006, pp. 1405-1407.

(Continued)

Primary Examiner — Michael A Lyons
(74) Attorney, Agent, or Firm — Brinks Hofer Gilson & Lione

(57) ABSTRACT

An optical system includes more than two optical interferometers that generate interference phenomena between optical waves to measure a plurality of distances, a plurality of thicknesses, and a plurality of indices of refraction of a sample. An electromagnetic detector receives an output of the optical interferometers to render a magnified image of at least a portion of the sample. A controller reduces or eliminates undesired optical signals through a hierarchical phase unwrapping of the output of the electromagnetic detector.

21 Claims, 8 Drawing Sheets

OTHER PUBLICATIONS

Ferraro, P. et al., "Quantitative Phase Microscopy of microstructures with extended measurement range and correction of chromatic aberrations by multiwavelength digital holography," *Optics Express*, vol. 15, No. 22, 2007, pp. 14591-14600.

Goodman, J. W. et al., "Digital Image Formation form Electronically Detected Holograms," *Applied Physics Letters*, vol. 11, No. 3, 1967, pp. 77-79.

Grilli, S. et al., "Whole optical wavefields reconstruction by Digital Holography," *Optics Express*, vol. 9, No. 6, 2001, pp. 294-302.

Huntley, J. M. et al., "Temporal phase-unwrapping algorithm for automated interferogram analysis," *Applied Optics*, vol. 32, No. 17, 1993, pp. 3047-3052.

Iwai, H. et al., "Quantitative phase imaging using actively stabilized phase-shifting low-coherence interferometry," *Optics Letters*, vol. 29, No. 20, 2004, pp. 2399-2401.

Kim, M. K. et al., Chapter 2, "Digital Holography and Multi-Wavelength Interference Techniques," *Digital Holography and Three-Dimensional Display: Principles and Applications*, Springer, New York, New York, Copyright 2006, pp. 51-72.

Kühn, J. et al., "Real-time dual-wavelength digital holographic microscopy with a single hologram acquisition," *Optics Express*, vol. 15, No. 12, 2007, pp. 7231-7242.

Lo, C. F., "Surface normal guided method for two-dimensional phase unwrapping," *Optik*, vol. 113, No. 10, 2002, pp. 439-447.

Lue, N. et al., "Quantitative phase imaging of live cells using fast Fourier phase microscopy," *Applied Optics*, vol. 46, No. 10, 2007, pp. 1836-1842.

Mann, C. J. et al., "High-resolution quantitative phase-contrast microscopy by digital holography," *Optics Express*, vol. 13, No. 22, 2005, pp. 8693-8698.

Mann, C. J. et al., "Movies of cellular and sub-cellular motion by digital holographic microscopy," *BioMedical Engineering OnLine*, vol. 5, 2006, pp. 1-10.

Mann, C. J. et al., "Quantitative phase imaging by three-wavelength digital holography," *Optics Express*, vol. 16, No. 13, 2008, pp. 9753-9764.

Goodman, J. W., *Introduction to Fourier Optics*. 2ed. McGraw-Hill, New York, New York, Copyright 1996, 456 pages.

Schnars, U. et al., "Direct recording of holograms by a CCD target and numerical reconstruction," *Applied Optics*, vol. 33, No. 2, 1994, pp. 179-181.

Török, P. et al., *Optical Imaging and Microscopy: Techniques and Advanced Systems*, Springer, Berlin, Germany, Copyright 2003, 405 pages.

Warnasooriya, N. et al., "LED-based multi-wavelength phase imaging interference microscopy," *Optics Express*, vol. 15, No. 15, 2007, pp. 9239-9247.

Yamauchi, T., "Low-coherent quantitative phase microscope for nanometer-scale measurement of living cells morphology," *Optics Express*, vol. 16, No. 16, 2008, pp. 12227-12238.

Yu, L. et al., "Improved tomographic imaging of wavelength scanning digital holographic microscopy by use of digital spectral shaping," *Optics Express*, vol. 15, No. 3, 2007, pp. 878-886.

Yu, L. et al., "Wavelength scanning digital interference holography for variable tomographic scanning," *Optics Express*, vol. 13, No. 15, 2005, pp. 5621-5627.

Park, Y. et al.; "Diffraction phase and fluorescence microsopy"; Optics Express, vol. 14, No. 18; Optical Society of America; pp. 8263-8268; Sep. 2006.

* cited by examiner

THREE WAVELENGTH QUANTITATIVE IMAGING SYSTEMS

BACKGROUND OF THE INVENTION

1. Related Application

This application is related to U.S. application Ser. No. 12/405,063 filed on Mar. 16, 2009, entitled "Quantitative Phase-Imaging Systems" and U.S. application Ser. No. 12/405,089 filed on Mar. 16, 2009, entitled "Quantitative Phase-Contrast and Excitation-Emission Systems" which are incorporated by reference.

2. Technical Field

This disclosure relates to optical systems and particularly to systems that generate three-dimensional visual images while suppressing undesired signals.

3. Related Art

Processes that determine position on or within an object may monitor other systems. Research and manufacturing are becoming reliant on some processes that make high-speed, precise shape and deformation measurements. Some scanning and contact methods provide high precision measurements but at very slow speed.

When optical devices are used, surface features may be magnified by phase unwrapping processes. These processes may be computationally intensive, may not match a human's perception of time (e.g., real-time), and may introduce unwanted interference or noise.

SUMMARY

An optical system includes more than two optical interferometers that generate interference phenomena between optical waves to measure a plurality of distances, a plurality of thicknesses, and a plurality of indices of refraction of a sample. An electromagnetic detector receives an output of the optical interferometers to render a magnified image of at least a portion of the sample. A controller reduces or eliminates undesired optical signals through a hierarchical phase unwrapping of the output of the electromagnetic detector.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
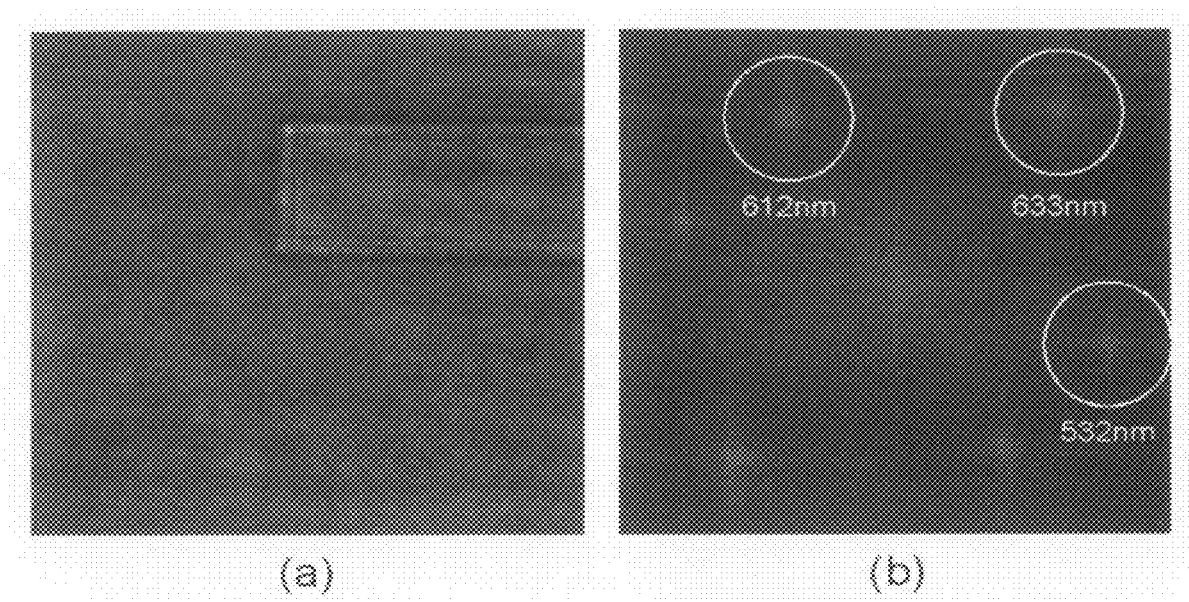
FIG. 1 is a three wavelength hologram and corresponding Fourier spectrum.

An optical system may reproduce three-dimensional visual images by recording light interference patterns on a recording medium. The system may measure quantitative phase information that may detect height changes of a few nanometers or less, render distinct image clarity in real-time through a numerical focus, and may capture a large depth of field in a single image (e.g., a single shot).

The optical system may include three or more digital optical interferometers that may not require multiple image acquisitions through a sequence of illuminating projections. When reconstructed, the images may provide high resolution data that may establish length, width, and/or depth information while suppressing distortion that may occur during signal capture. The phase information may establish a refractive index and/or optical thickness of an object or sample. The data captured may be retained within a local or a remote memory or database that facilitates real-time imaging and viewing (e.g., through a display or device that generates video signals) locally or at a remote site. The speed that images captured may depend on the frame rate of capture of an interfaced recording device or latency in which the data is stored or written into the local and/or remote memory. The magnification may differ from some phase-shifting techniques, in which the speed of image capture may depend on the speed at which the phase-shifting device may be adjusted.

In some optical systems increasing the phase range (optical phase unwrapping) may be implemented through two or more wavelengths. The combination of phase images of two different wavelengths $\lambda_1$ and $\lambda_2$ in an alternate optical system may render another phase image having an effective wavelength (or synthetic wavelength) described by equation 1.

$$\Lambda_{12} = \lambda_1 \lambda_2 / |\lambda_1 - \lambda_2|. \quad (1)$$

Through a predetermined selection of the two wavelengths, the axial range $\Lambda_{12}$ may be adjusted to a value that captures the axial size of the object being imaged. To obtain a longer range, the two wavelength values $\lambda_1$ and $\lambda_2$ may be selected close together. In some applications, when the difference between the two images is captured, $\Lambda_{12}$ may become noisy due to error amplification. This may introduce distortion or unwanted signals in the phase measurement that may reduce image quality.

Some systems may reduce the affect of unwanted or undesired signals through a systematic reduction in wavelength. The systems may process information or data from the larger-wavelength measurements to remove $2\pi$ ambiguities that may exist in the shorter-wavelength data. Through a hierarchical phase unwrapping process, an optical system may use a noisier, larger synthetic wavelength, $\Lambda_{12}$, to unwrap a higher resolution shorter wavelengths, $\Lambda_1$ or $\Lambda_2$, which may reduce unwanted interference. These systems may provide large axial range and render high precision optical images. To suppress noise and reduce distortion the optical system may satisfy the condition described by equation 2.

$$\Lambda_{n+1}(1 - 4\epsilon_{n+1}) \geq \Lambda_n \epsilon_n \quad (2)$$

In equation 2, $\Lambda_{n+1}$ comprise the reduced wavelength, $\epsilon_{n+1}$ comprises the wavelength's associated noise, $\Lambda_n$ comprises the larger synthetic wavelength, and $\epsilon_n$ comprises the larger synthetic wavelength's associated noise. Through this condition, a large-difference reduction, $\Lambda_n/\Lambda_{n+1}$, in the presence of a large amount of noise, may be difficult to achieve without being subject to errors.

To minimize errors and suppress or minimize associated noise, three or more digital optical interferometers may capture and produce a three-dimensional visual image on a display. The system may execute a synthetic-wavelength hierarchical unwrapping that generates one or more intermediate synthetic wavelengths. The wavelengths may facilitate smaller-difference reductions in a phase unwrapping process. In some optical systems, the corrected phase data of the intermediate synthetic wavelength may be processed to correct the ambiguities in the single-wavelength phase data. By this correction, the optical system may execute long range phase imaging while maintaining the high-precision (and low noise) of the single-wavelength phase measurement. The system may update an image at the same rate the data is received or execute activities that match a user's perception of time (e.g., real-time) to capture (and reproduce) a three-wavelength complex wave-front in one digital image. Some optical systems may measure a surface profile to quantify its roughness (to at least a nanometer level) at a high vertical and lateral resolution. The optical system may serve as a non-contact profilometer over a range of small and/or large measurement gauge heights. The system may capture three or more-wavelength wave-fronts in real-time and may make direct and/or long-range shape measurements of dynamically moving or continuously changing samples at high resolution and at high rate of speed.

Figure 8:
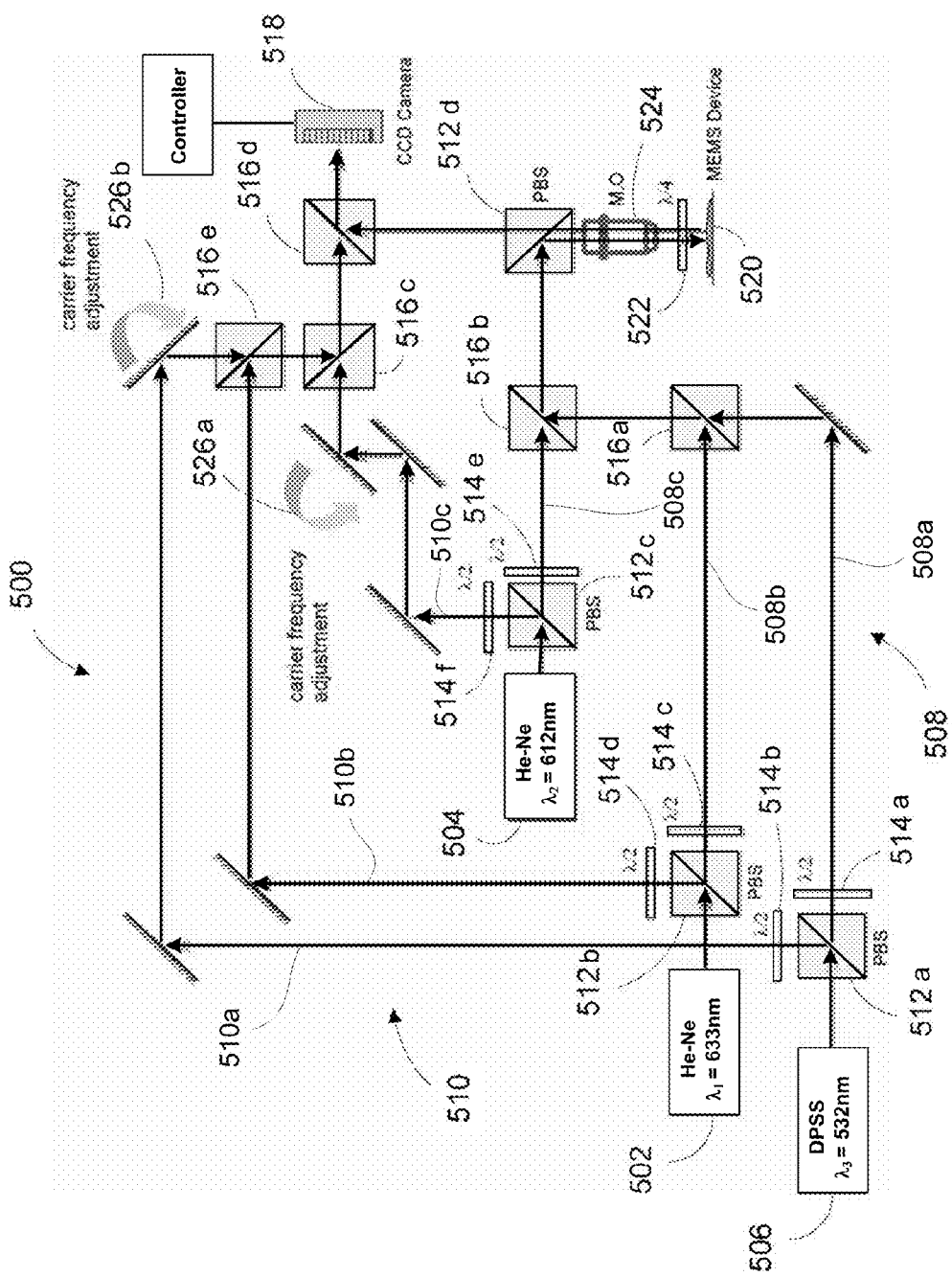
FIG. 8 is the exemplary three-wavelength digital holographic system of FIG. 5 in communication with a controller.

Some optical systems may capture interference through an imaging device or a light detecting device such as a Charge-Coupled-Device (CCD) or CCD camera that may store the captured image in a local or remote memory (e.g., a solid-state memory erased in blocks or bytes, for example, a hard drive, etc.). When captured, the image may be transferred to one or more local or remote controllers, processors, signal processors (referred to as the controller) (See FIG. 8) through a wireless or tangible link. The controller may execute a numerical reconstruction of the complex wave-field through an angular spectrum off-axis digital holography described in equation 3.

$$E(x, y, z) = \mathcal{F}^{-1}\left\{\text{filter}[\mathcal{F}\{U(x_0, y_0, 0)\}]\exp\left[iz2\pi\sqrt{\left(\frac{1}{\lambda}\right)^2 - (f_x)^2 - (f_y)^2}\right]\right\} \quad (3)$$

In equation 3, $U(x_0,y_0,0)$ comprises a complex wave-front in the hologram plane $f_x$ and $f_y$ comprises frequency coordinates in the frequency domain, and filter comprises the digital filtering which allows the spatial frequencies of each wavelength to be isolated in inverse space as displayed in the exemplary digital image of a gold bar on a metal or mirrored background shown in FIG. 1 (FIG. 1(b) shows the corresponding Fourier spectrum of FIG. 1(a)).

In equation 3, two Fourier transforms are processed. When a field is captured or known in any one plane, one additional Fourier transform is processed to reproduce the field at different values of a reconstruction distance, z. Through this process (e.g., generating the angular spectrum), some optical systems have no minimum reconstruction distance requirement. This means that an object may be placed in or close to a hologram plane, and the pixel size of the reconstructed image does not vary as a function of the reconstruction distance.

Figure 2:
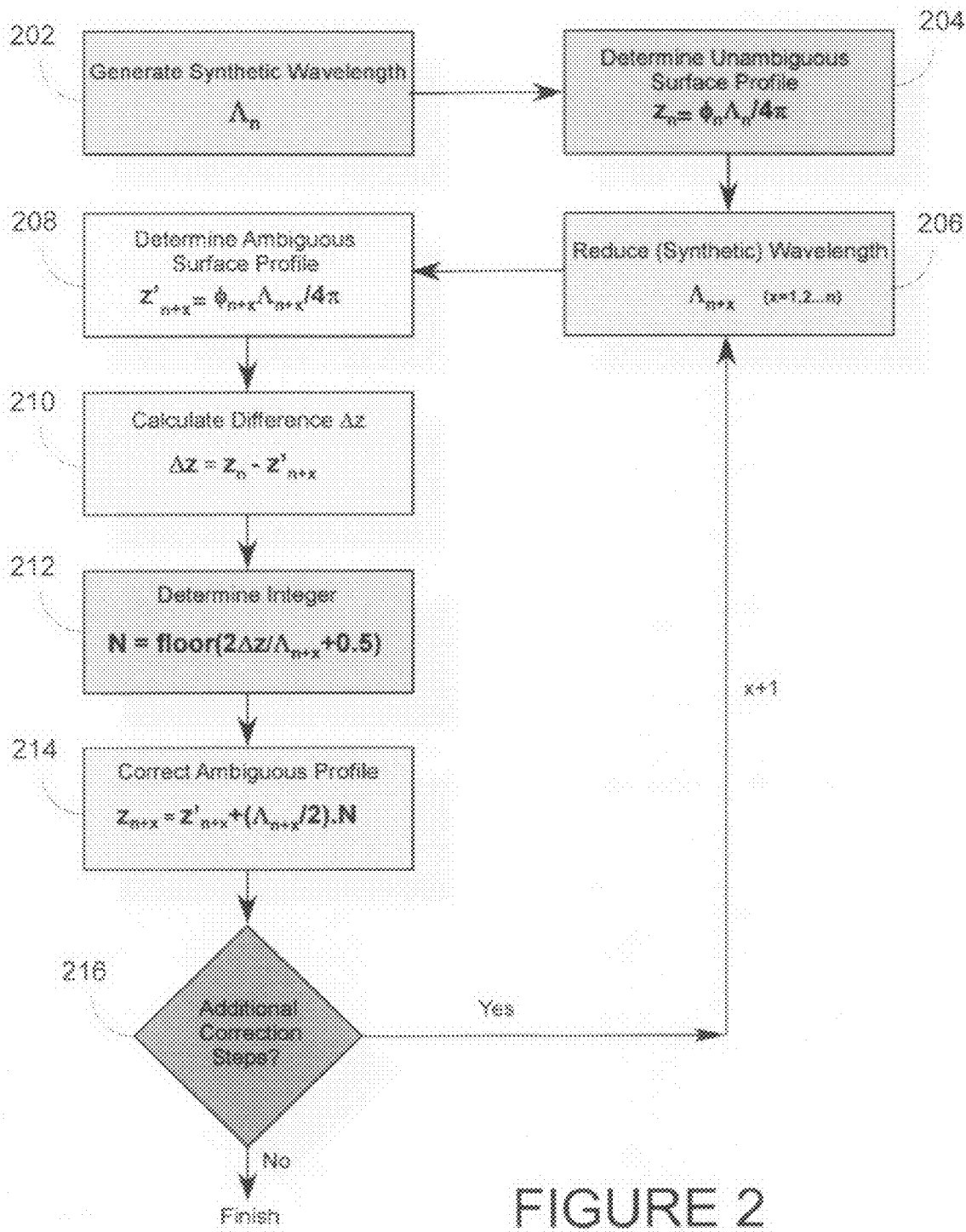
FIG. 2 is a hierarchical optical phase unwrapping process that may be stored in a memory and executed by a processor and/or controller.

FIG. 2 shows an exemplary hierarchical phase unwrapping process. At 202 the process generates a synthetic wavelength $\Lambda_n$ that may be (or is at least greater than) twice (or about twice) the maximum height variation of the sample or object (referred to as the object). Because of the new unambiguous phase range, the phase noise may be amplified. At 204, the unambiguous surface profile is generated. From the resulting quantitative phase data, the corresponding surface height information $\Lambda_n$ is described by equation 4.

$$z_n = \frac{\theta_n}{4\pi}\lambda_n \quad (4)$$

At 206 and 208 the process reduces the wavelength at which the measurement occurs, and processes the data of the unambiguous, larger-wavelength measurements to eliminate or substantially minimize the ambiguities by determining the interference order. At 210, the process calculates the difference between the unambiguous surface profile, $z_n$, and the ambiguous surface profile $z'_{n+x}$ (the apostrophe indicates ambiguous throughout this disclosure) with related wavelength $\Lambda_{n+x}$:

$$\Delta z = z_n - z'_{n+x} \quad (5)$$

At 212, the process derives an integer multiple. The controller determines the number of times a surface profile may be divided by the reduced (or synthetic) wavelength with no remainder. The integer component in $\Delta z$ is described by equation 6.

$$N = \text{floor}\left(\frac{2\Delta z}{\Lambda_{n+x}} + 0.5\right) \quad (6)$$

To correct the ambiguous profile, the process adds the integer multiples of the reduced synthetic wavelength to the original ambiguous profile $z'_{n+x}$ at 214.

$$z_{n+x} = z'_{n+x} + \frac{\Lambda_{n+x}}{2}N \quad (7)$$

Due to the shorter wavelength, the accuracy of the rendered image is improved over $z_n$ and $z_{n+x}$ becomes unambiguous, with an improved accuracy. At 214 the process may continue applying signal correction for smaller and smaller wavelengths through a repetition (established at 216) of 206-214. In each iteration, a desired resolution may determine the fineness of detail that may apply and the level of noise or interference suppression desired. The resolution may be pre-programmed, run continuously until a threshold is reached (e.g., a predetermined threshold), and/or entered (e.g., interactively or on a schedule such as a batch request) by a user.

Figure 3:
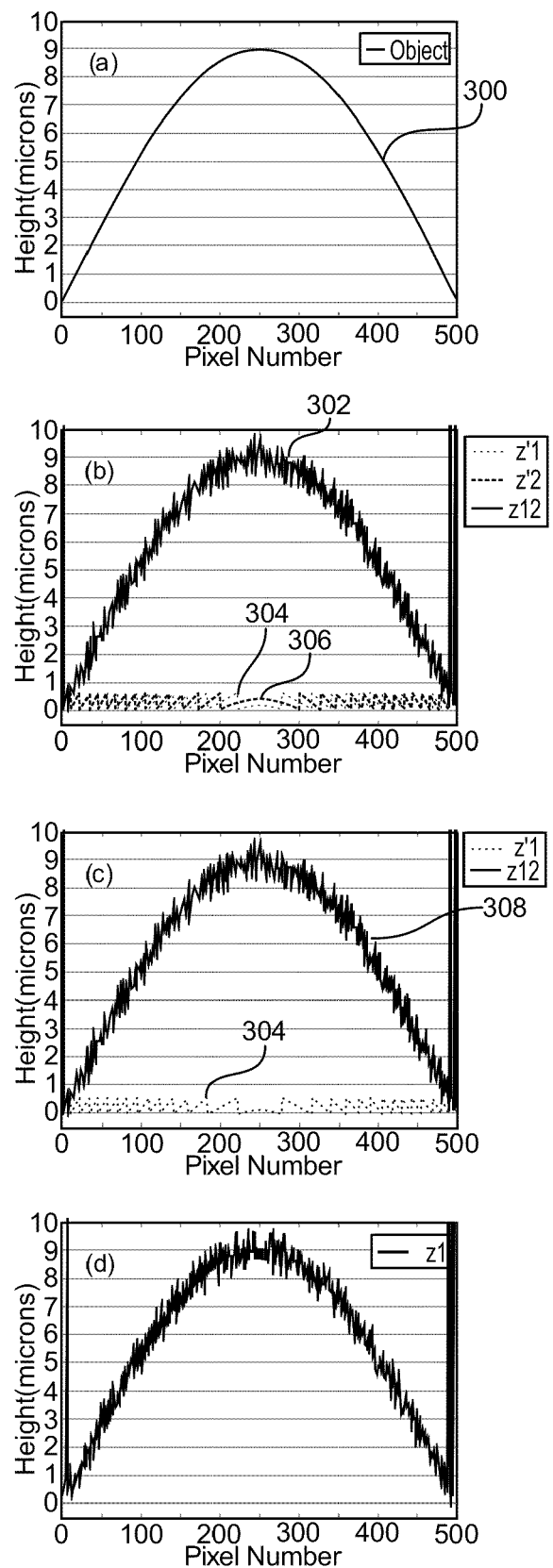
FIG. 3 is a simulation of two-wavelength digital holography.

FIG. 3 is a pictorial simulation of a two-wavelength digital holography. The theoretical object 300 shown in FIG. 3(a) is a symmetrically curved surface, with a maximum height of h=9.0 μm. To simulate the noise level associated with experimental conditions, a white noise level of $\epsilon_i\sim2\%$ is added to each single-wavelength profile so that each profile contains a noise level of $\lambda_i\epsilon_i$ (shown as 302). In FIG. 3(b) the corresponding surface profiles $z'_1$ (302) and $z'_2$ (304) comprises a number of discontinuities at each multiple of the wavelength is shown. In FIG. 3(b) surface profile plot for $z'_1$ (302) is derived from $\phi_1$ where $\lambda_1$=633 nm, $z'_2$ is derived from $\phi_2$ where $\lambda_2$=612 nm, and the corresponding two-wavelength unambiguous surface profile $z_{12}$ (302) with synthetic wavelength $\Lambda_{12}$=18.45 μm is derived from the single wavelength profiles $z'_1$ (304) and $z'_2$ (306). Subtraction of their respective phase data, $\phi'_{12}=\phi_1-\phi_2$ and the addition of $2\pi$ wherever $\phi_{12}<0$ produces a new phase profile, $\phi_{12}(x)=\phi'_{12}+2\pi\cdot((\phi'_{12}<0)$, with a new synthetic wavelength $\Lambda_{12}$=18.45 μm. The corresponding two-wavelength surface profile (302), $z_{12}=\phi_{12}\Lambda_{12}/4\pi$ is shown in FIGS. 3(b) and 3(c). In FIG. 3(c) shows the $2\pi$ ambiguity correction of $z'_1$ (304) using the two-wavelength surface profile $z_{12}$ (302).

While $z_{12}$ (302) is unambiguous, the phase noise in each single-wavelength phase map is amplified by a factor equal to the magnification of the wavelengths. In FIGS. 3(b) and 3(c), $z_{12}$ (302) is obscured by noise. To recover the accuracy of the measurement, $z_{12}$ (302) is processed to correct for the ambiguities in the high precision, single wavelength profile $z'_1$ (304). As shown in FIG. 3(d), the processing of the two-wavelength digital holography generates integer addition errors due to the large amount of noise in $z_{12}$ (302) (e.g., larger than $\lambda_1/2$). The remaining spikes (or interference) in the final surface ambiguity corrected surface height profile, $z_1$ may occur at positions in which the two-wavelength profile noise is too large and may not satisfy the condition established by equation 2.

Figure 4:
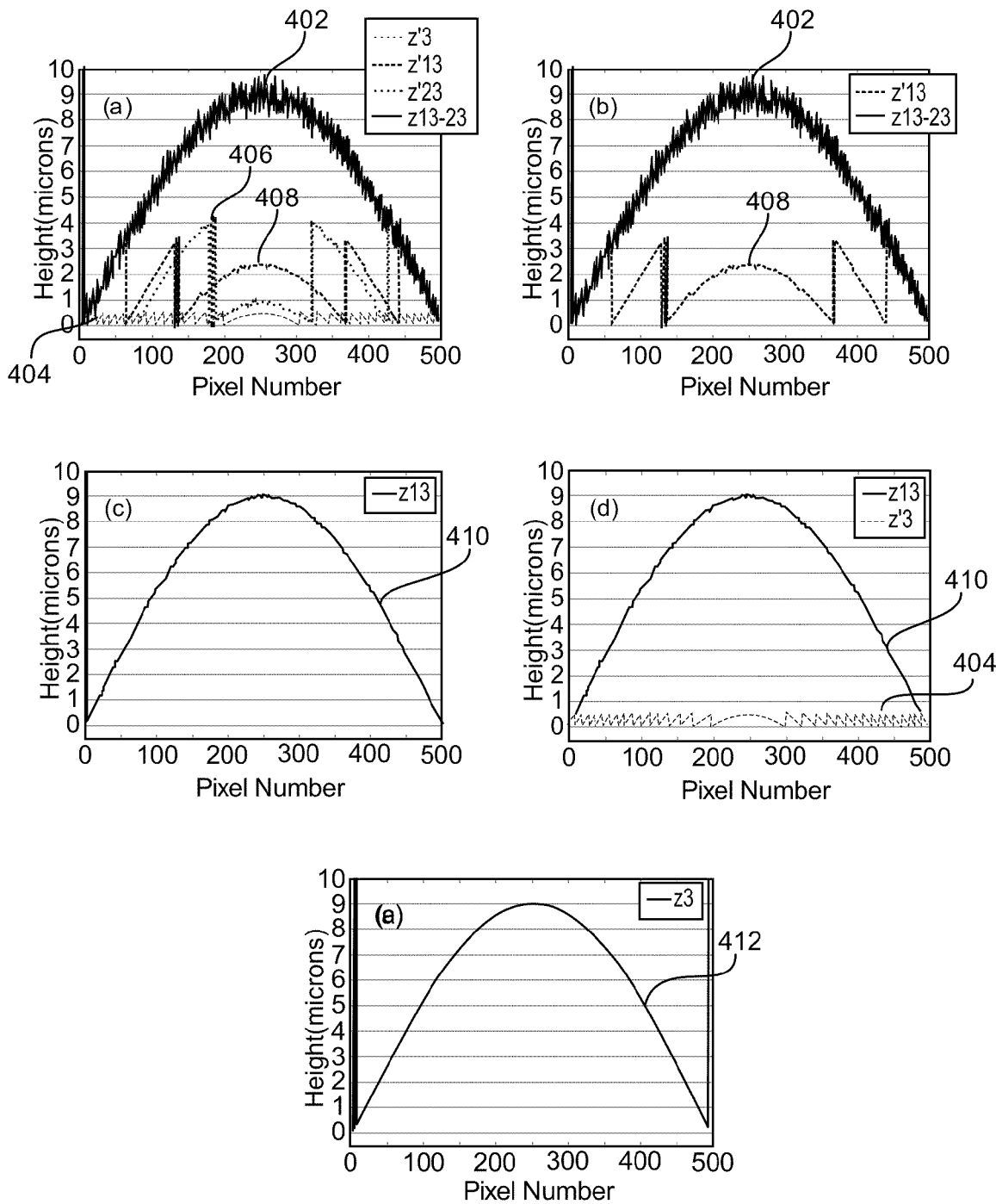
FIG. 4 is a simulation of three-wavelength digital holography using the theoretical object shown in FIG. 3(a).

FIG. 4 is a pictorial a simulation of three-wavelength digital holography. The addition of a third, shorter wavelength into the simulation procedure at $\lambda_3$=532 nm, generates an extended range synthetic wavelength of $\Lambda_{13\text{-}23}$=18.45 μm (402) and intermediate synthetic wavelengths at $\Lambda_{13}$=3.33 μm and $\Lambda_{23}$=4.07 μm. FIG. 4(a) displays the single wavelength surface profile $z'_3$ ((404) derived from $\phi_3$ where $\lambda_3$=532 nm), the intermediate profiles $z'_{23}$ ((406) derived from $\phi_{23}$ with synthetic wavelength of $\Lambda_{23}$=4.07 μm), $z'_{13}$ ((408) a two-wavelength surface profile derived from $\phi_3$ with synthetic wavelength of $\Lambda_{13}$=3.33 μm). The extended range unambiguous two-wavelength surface profile $z_{13\text{-}23}$ ((402) synthetic wavelength $\Lambda_{12}$=18.45 μm) is derived from $z'_{23}$ (406) and $z'_{13}$ (408). A comparison of FIG. 4(a) to FIG. 3(b) reveals that $z_{13\text{-}23}$ (402) is identical (or nearly identical) to the two-wavelength profile $z_{12}$ (308).

Instead of correcting for the ambiguities in $z'_1$ using $z_{13\text{-}23}$ (403), where the combination of noise and reduction may be too large to give an accurate result, an intermediate profile $z'_{13}$ (408) is corrected as shown in FIG. 4(b). In FIG. 4(b) the intermediate synthetic wavelength profile $z'_{13}$ (408) is corrected (by the process of FIG. 2) using $z_{13\text{-}23}$ (402). The result substantially recovers theoretical object's (300) profile accuracy as shown in FIG. 4(c), which shows the ambiguity corrected profile, $z_{13}$ (410).

In FIG. 4, the process of FIG. 2 applies additional correction as the ambiguity corrected profile, $z_{13}$ (410), is used to correct the ambiguities in the single wavelength profile $z'_3$ (408). FIG. 4(d) shows the phase data from the intermediate profile $z_{13}$ 410 processed to correct for the ambiguities in the single-wavelength phase data $z'_3$ (404). The final surface profile result, $z_3$ (412), with the single-wavelength precision fully restored, is shown in FIG. 4(e).

Figure 5:
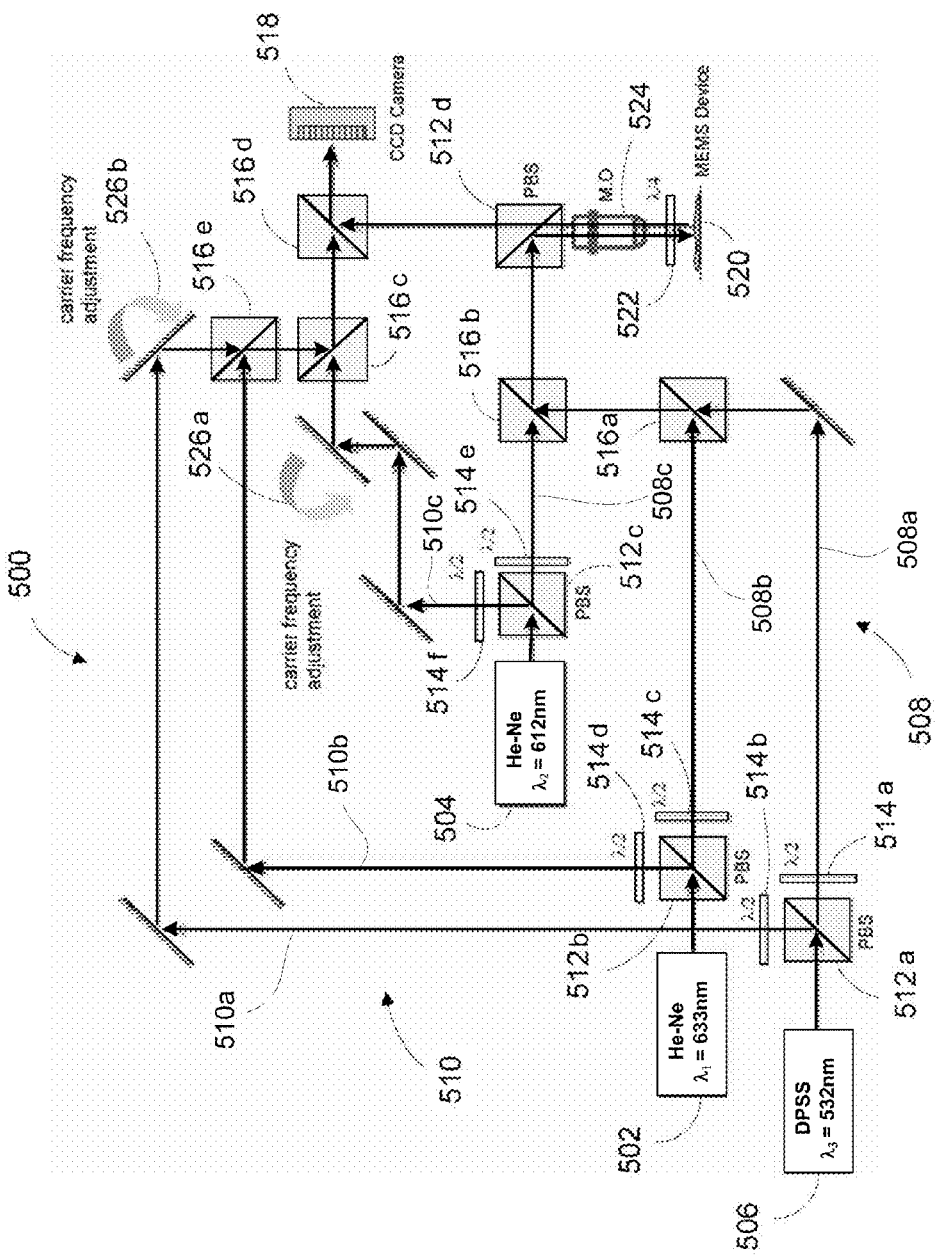
FIG. 5 is an exemplary three-wavelength digital holographic system.

FIG. 5 shows a three wavelength optical system 500 that includes three interferometers in an achromatic arrangement that brings three wavelengths emitted from three light sources 502, 504, and 506 into one imaging optical system 500. Angles are created between the object and the reference beams 508 and 510 (including object beams 508a, 508b, and 508c, and reference beams 510a, 510b, and 510c) for off-axis optical interferometer rendering (e.g., holography) by tilting the combination of reflecting surfaces (or mirror) in the reference beam path and a polarizing beam splitter 512 (e.g., $\lambda/4$: quarter-wave plate). The tilt (established by the carrier frequency adjustment) provides a frequency modulation in the interference between the object and the reference beams 508 and 510 that creates a separation of respective optical interferometers (or holographic) and DC terms in a Fourier space. The CCD (e.g., CCD camera) may record the digital optical interferometers output (or holograms) in real-time through a single digital image before it is digitally transferred to a local or remote controller through a wireless or tangible link. The quantitative amplitude and phase of the complex wave-front may then be extracted and processed.

In the arrangement of FIG. 5, the reference beams 510 originate from three (e.g., multiple) separate light sources 502, 504, and 506 that have electromagnetic spectrums in the 1 visible or invisible electromagnetic range. Polarizing beam splitters 512 (including beam splitters 512a, 512b, 512c, and 512d) and half-wavelength plates ($\lambda/2$) 514 (including plates 514a, 514b, 514c, 514d, 514e, and 514f) split the input light into two or more parts (e.g., the object path and the reference path) at a predetermined ratio.

The polarizing beam splitters 512 may interface a single mode fiber optic cable and may comprise a single window. A single window may have a single wavelength with a narrow wavelength window. A multiple window fiber optic coupler (not shown) may support two or more wavelengths in alternate systems with a wide wavelength window for each input. Filter cubes 516 (including filter cubes 516a, 516b, 516c, 516d, and 516e) (e.g., a dichroic surface or mirror that includes an adjustment device to change the inclination of the surface without directly handling the surface or filters) combine the object beams 508 in the object path and the reference beams 510 in the reference path.

When the interference phenomena or holograms have been captured through a CCD device or camera 518, the images may be transmitted through a parallel or serial interface (e.g. an IEEE 1394b) and a wireless or tangible medium to a remote or local processor or signal processor. Numerical band-pass filters (devices or programs) may process the separate interference or holographic terms originating from the multiple wavelengths, from which the interference or holographic phase images may be reconstructed. Through the numerical focusing of the digital interferometers or holographic devices, the reconstructed images at each wavelength may be focused to enable a precise image capture of the object 520 through the microscope objective 524 and quarter-wavelength plate ($\lambda/4$) 522.

In FIG. 5 the light sources 502, 504, and 506 may comprise three laser sources. An exemplary configuration may comprise two He—Ne lasers emitting at wavelengths of about $\lambda_1$=633 nm and $\lambda_2$=612 nm and a third diode pumped solid state (DPSS) laser emitting at about $\lambda_3$=532 nm. The three sources generate synthetic wavelengths of about $\Lambda_{12}$=18.45 μm, about $\Lambda_{23}$=4.07 μm, and about $\Lambda_{13}$=3.33 μm respectively. $\Lambda_{12}$ may establish the large phase range of the system, with $\Lambda_{23}$ and $\Lambda_{13}$ providing the intermediate synthetic wavelengths.

The three off-axis interferometers in the achromatic setup bring each wavelength into one imaging system. The reference beam of each interferometer is adjusted so that all three holograms are recorded with a different set of spatial frequencies in a single digital image, thereby allowing for real-time capture of the three-wavelength complex wave-front. Through the numerical focusing of the digital interferometers or holographic devices, the reconstructed images at each wavelength may be focused to enable an exact (or nearly exact superposition) of the object 520. To correct for residual optical aberrations in the reconstructed image, a flat-field reference hologram may be recorded on a flat, blank portion of the object 520.

When recording more than two holograms in one digital image, a potential problem may be the carryover of information between the spatially-heterodyned holograms and the zero order image information in Fourier space. This problem may be overcome by adjusting the spatial frequencies of the individual holograms (e.g., through the adjustable carrier frequency adjustment devices 526, including adjustment devices 526a and 526b, or adjustable inclinable mirrors) to maximize separation from each other. Alternate systems may place an aperture in the optical system to reduce the spread in frequency space, or use smaller radius digital filters. Some applications may be sensitive to reducing the numerical aperture of the optical system.

Figure 6:
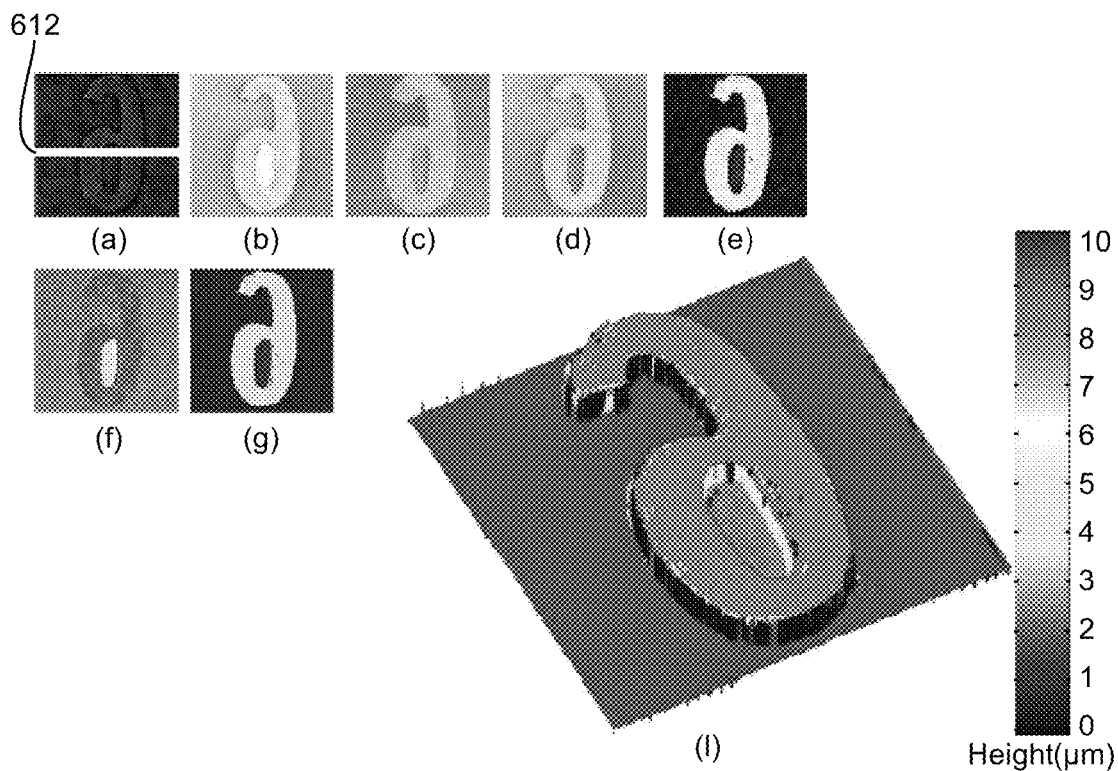
FIG. 6 is a three-wavelength digital holography of a gold-on-chrome resolution target.
Figure 6:
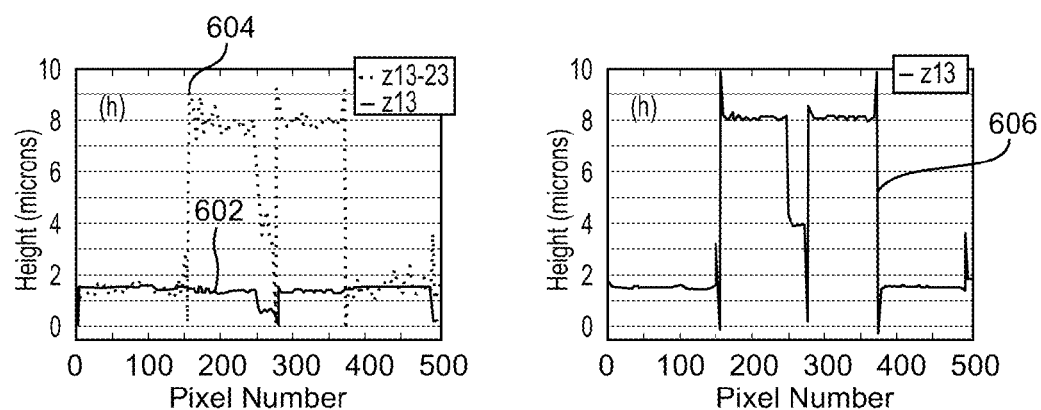
Figure 6:
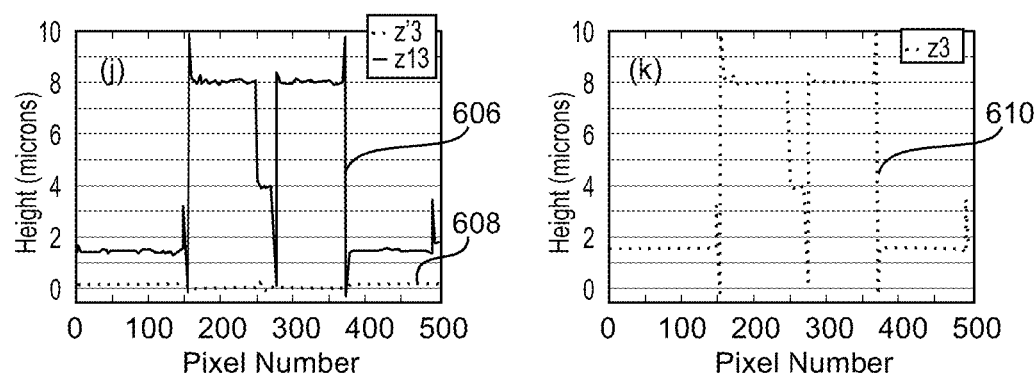

FIG. 6 is a three-wavelength digital holography of a 6.6 µm high gold-on-chrome resolution USAF 1951 (object or) target. FIG. 6(a) comprises a three-wavelength digital hologram of the target. FIG. 6(b) comprises a single-wavelength phase image with $\lambda_1 = \sim 633$ nm. FIG. 6(c) comprises a single-wavelength phase image with $\lambda_2 = \sim 612$ nm. FIG. 6(d) comprises a single-wavelength phase image with $\lambda_3 = \sim 532$ nm. FIG. 6(e) comprises two-wavelength phase image with synthetic wavelength $\Lambda_{12} = \sim 18.45$ µm. FIG. 6(f) comprises two-wavelength phase image with synthetic wavelength $\Lambda_{13} = \sim 3.33$ µm. FIG. 6(g) shows final ambiguity-corrected phase image.

The single-wavelength phase images reconstructed from the three-wavelength hologram displayed in FIG. 6(a) (shown in FIGS. 6(b), 6(c) and 6(d)) each include a root mean squared (rms) noise level of $\epsilon_i \sim 8$ nm. The single-wavelength images are combined to generate the large synthetic wavelength phase image ($\Lambda_{13-23} = \sim 18.45$ µm) in FIG. 6(e) and the intermediate synthetic wavelength phase image ($\Lambda_{13} = 3.33$ µm) in FIG. 6(f). The corresponding quantitative cross-sectional surface profiles for these images, as taken along the line 612 in FIG. 6(a) are shown in FIG. 6(h). The extended range profile $z_{12-23}$ is unambiguous; however the noise has been magnified with the rms noise now at $\epsilon_{12-23} \sim 520$ nm. The large noise level in $z_{12-23}$ may make the accurate correction of the ambiguities in the single-wavelength profile through a single process, ineffective, as verified by the application of equation 2 renders:

$$\lambda_3(1-4(\epsilon_3)) \geqq (\Lambda_{12-23})(\epsilon_{12})$$

$$0.532 \text{ µm}(1-4(0.015)) \geqq (18.45 \text{ µm})(0.028)$$

$$0.504 \geqq 0.520$$

To improve the measurement accuracy, hierarchical phase unwrapping may be applied. First, the intermediate step profile $z'_{13}$ (602), with rms noise $\epsilon_{12-23} \sim 57$ nm is corrected for ambiguities using $z_{13-23}$ (604), as shown in FIG. 6(h). The execution from equation 2 renders:

$$\Lambda_{13}(1-4(\epsilon_{13})) \geqq (\Lambda_{12-23})(\epsilon_{12})$$

$$3.33 \text{ µm}(1-4(0.017)) \geqq (18.45 \text{ µm})(0.028)$$

$$3.102 \geqq 0.520$$

The ambiguity corrected intermediate result, $z_{13}$ (606), displayed in FIG. 6(i), is processed to correct for the ambiguities in the single-wavelength profile $z'_3$ (608) shown in FIG. 6(j). FIG. 6(j) shows the $2\pi$ ambiguity correction of single wavelength profile $z'_3$ (608) using $z_{13}$ (606). The execution of this act from equation 2 renders:

$$\lambda_3(1-4(\epsilon_3)) \geqq (\Lambda_{13})(\epsilon_{13})$$

$$0.532 \text{ µm}(1-4(0.015)) \geqq (3.33 \text{ µm})(0.017)$$

$$0.504 \geqq 0.056$$

The final result, $z_3$ (610), shown in FIG. 6(k) where the height range is extended and the precision of the single-wavelength measurement is very nearly fully restored. The few remaining spikes remain where excessive combinations of noise and the wavelength reduction were too large to determine the order of the fringe number. The final corrected image is shown in FIG. 6(g), along with its 3D-rendering shown in FIG. 6(l). From the image, the measured step height is observed to be ~6.6 µm, which confirms the manufacturers specifications for the test target structures. The three-wavelength optical system rendered low noise through a long measurement range.

Figure 7:
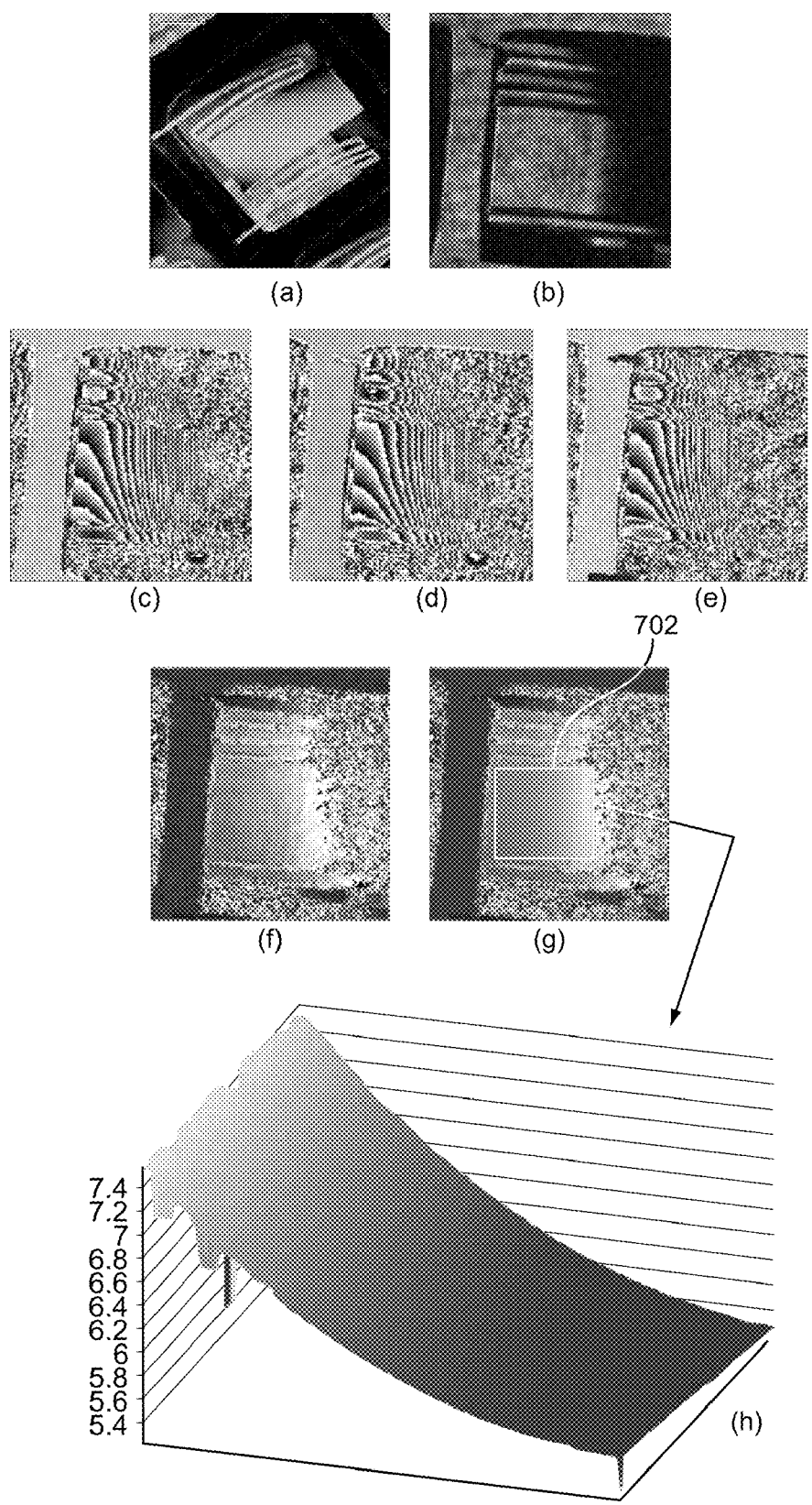
FIG. 7 is a three-wavelength digital holography of an infrared micro-cantilever device.

FIG. 7 is a three-wavelength digital holography of a micro-electro-mechanical (or MicroElectroMechanical or MMS) device. The object comprises a micro-cantilever array designed for infra-red sensing having dimensions of about 100 µm×88 µm. The cantilevers in the array exhibit a shape deflection as they are exposed to infra-red radiation.

A Scanning Electron Microscope (SEM) image of the cantilever is shown in FIG. 7(a) illustrating the characteristic bend of the central infra red (IR) absorber. FIG. 7(b) comprises the amplitude reconstruction from the hologram. FIG. 7(c) comprises single-wavelength phase image with $\lambda_1 = \sim 633$ nm. FIG. 7(d) comprises a single-wavelength phase image with $\lambda_2 = \sim 612$ nm. FIG. 7(e) comprises a single-wavelength phase image with $\lambda_3 = \sim 532$ nm.

In FIG. 7, the single-wavelength images are combined, and then optical phase unwrapping is applied in order to create the extended range two-wavelength phase image having a synthetic wavelength $\Lambda_{12} = \sim 18.45$ µm as shown in FIG. 7(f). The final three-wavelength image is shown in FIG. 7(g) (having with synthetic wavelength $\Lambda_{12} = \sim 18.45$ µm), with unambiguous range and low noise. A visual comparison between the two and three-wavelength images highlights shown in FIG. 7 show the considerable noise reduction achieved by the three-wavelength optical system. In FIG. 7(g) the highlighted area 702 is selected and a 3×3 median filter is applied to suppress the few remaining undesired spikes. The 3D rendering of this filtered area is displayed in FIG. 7(h) with the cantilever exhibiting a deflection of around 2 µm. In this example, the three-wavelength wave-front may be captured in real-time. The system or method may make direct, long-range shape measurements of dynamically moving samples with high resolution and speed.

In each of the described optical systems, communication may occur through a wireless protocol. The communication protocol may provide an interoperable communication link with CCD, sensors, external applications, processors and/or remote sites. In some systems, the wireless links provides connectivity when the wireless network or a wireless service provider indicates a channel capacity or excess channel capacity to transfer some or all of the desired data to a destination. A CCD device may push desired data to a destination and may keep a connection open to allow the CCD device, sensors, controllers, and/or etc. (CCD et al.), to continue to send desired data or respond to external requests (e.g., queries) as a sample is monitored (e.g., in real-time). A CCD et al. may pull data from a site in real-time too through a persistent or non-persistent connection.

Each of the systems described may include a wireless transceiver compliant with a cellular or wireless protocol, a wireless or cellular telephone, a radio, a satellite, or other wireless communication system that may link the CCD et al to a privately accessible or publicly accessible distributed network or directly to an intermediate surrogate or central operations center. The communication link may comprise Mobile-FI or a low-cost, always-on, mobile broadband wireless network that may have IP (Internet Protocol) roaming & handoff (at more than about 1 Mbit/s), MAC and PHY with IP and adaptive antennas, full mobility or substantial mobility up to vehicle speeds of about 88.7-162 km/h or higher (e.g., 250 km/h), operate in frequency bands (below 3.5 GHz), and/or utilize a packet architecture and have a low latency.

In some applications, the optical system may be Ultra-wideband compliant and may transmit information by generating radio energy at specific time instants and occupying large bandwidth, thus enabling a pulse-position or time-modulation communications. This protocol may be different from other wireless protocols that transmit information by varying the power level, frequency, and/or phase of a sinusoidal wave.

In other applications, the optical device may be complaint with WiMax or IEEE 802.16a or may have a frequency band within a range of about 2 to about 11 GHz, a range of about 31 miles, and a data transfer rate of about 70 Mbps. In other applications, the mobile monitoring device 100 may be compliant with a Wi-Fi protocols or multiple protocols or subsets (e.g., ZigBee, High Speed Packet Access (e.g., High Speed Downlink Packet Access and/or High Speed Uplink Packet Access), Bluetooth, Mobile-Fi, Ultrawideband, Wi-Fi, WiMax, mobile WiMax, cellular, satellite, etc., referred to as the transceiver protocols) that may be automatically detected and selected (through a handshaking, for example, that may automatically determine the source type of the transmission e.g., by a query for example, and may attempt to match it) and may enable this automatic access through one or more communication nodes.

Other alternate systems and methods may include combinations of some or all of the structure and functions described or shown in one or more or each of the figures. These systems or methods are formed from any combination of structure and function described or illustrated within the figures. In some alternate systems, the interference imaging occurs in transmission and/or reflection modes.

In each of the systems described, an optional visual output device, video adapter, display driver, or display that may interface the local or remote memory, a remote or local processor, the CCD et al., etc. The display may support a graphical user interface that may allow an operator to enter point of interest identifiers (through icons, menus, dialog boxes, etc. selected through absolute and/or relative pointing devices) so that recorded characteristics may be associated with an image or a map (e.g., a topological map or simplified map that lacks some details or a topographic map that may show many details through contour lines, models, or other visual representations, or etc., for example). Some graphical user interfaces interface a touch screen that recognizes location and the intensity of touch (or simultaneous touches) on its surface by an operator or input device.

Some or all of optical systems may communicate with an optional visual output that may comprise a Light Emitting Diode display (LED), a Liquid Crystal display (LCD), or a remote controller (e.g., a computer screen, portable computer, a tablet computer, a personal digital device, and/or other displays) wirelessly or tangibly linked to the optical system. In some systems, the display may render real-time or delayed audio, visual, and/or tactile representations when a condition is detected, completed, is measured, or a programmed event occurs, etc.

The methods and descriptions herein may be programmed in one or more controllers, devices, processors (e.g., signal processors). The processors may comprise one or more central processing units that supervise the sequence of micro-operations that execute the instruction code and data coming from memory (e.g., computer memory) that generate, support, and/or complete a compression or signal modifications. The dedicated applications may support and define the functions of the special purpose processor or general purpose processor that is customized by instruction code (and in some applications may be resident to vehicles). In some systems, a front-end processor may perform the complementary tasks of gathering data for a processor or program to work with, and for making the data and results available to other (e.g., back-end) processors, controllers, or devices.

The methods and descriptions may also be programmed between one or more signal processors or may be encoded in a signal bearing storage medium a computer-readable medium, or may comprise logic stored in a memory that may be accessible through an interface and is executable by one or more processors. Some signal-bearing storage medium or computer-readable medium comprise a memory that is unitary or separate from a device, programmed within a device, such as one or more integrated circuits, or retained in memory and/or processed by a controller or a computer. If the descriptions or methods are performed by software, the software or logic may reside in a memory resident to or interfaced to one or more processors or controllers that may support a tangible or visual communication interface, wireless communication interface, or a wireless system.

The memory may include an ordered listing of executable instructions for implementing logical functions. A logical function may be implemented through digital circuitry, through source code, or through analog circuitry. The software may be embodied in any computer-readable medium or signal-bearing medium, for use by, or in connection with, an instruction executable system, apparatus, and device, resident to system that may maintain persistent or non-persistent connections. Such a system may include a computer-based system, a processor-containing system, or another system that includes an input and output interface that may communicate with a publicly accessible distributed network through a wireless or tangible communication bus through a public and/or proprietary protocol.

A "computer-readable storage medium," "machine-readable medium," "propagated-signal" medium, and/or "signal-bearing medium" may comprise any medium that contains stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An optical system comprising:
 a first optical interferometer that generates an interference phenomena between optical waves to measure a plurality of distances, a plurality of thicknesses, and a plurality of indices of refraction of a sample;
 a second optical interferometer optically linked to the first optical interferometer that generates a second interference phenomena between optical waves to measure a plurality of distances, a plurality of thicknesses, and a plurality of indices of refraction of the sample;
 a third optical interferometer optically linked to the second optical interferometer that generates a third interference phenomena between optical waves to measure a plurality of distances, a plurality of thicknesses, and a plurality of indices of refraction of the sample;
 an electromagnetic detector that receives an output of the first optical interferometer, the second optical interferometer, and the third optical interferometer to render an image of at least a portion of the sample; and
 a controller programmed reduce or eliminate undesired optical signals through a hierarchical phase unwrapping of the output of the electromagnetic detector and render a magnified image of at least a portion of the sample.

2. The optical system of claim 1 where the hierarchical phase unwrapping generates one or more intermediate synthetic wavelengths.

3. The optical system of claim 2 where the hierarchical phase unwrapping determines a surface profile of the one or more intermediate synthetic wavelengths.

4. The optical system of claim 2 where at least one of the intermediate synthetic wavelengths is about twice the maximum height variation of the sample.

5. The optical system of claim 2 where the controller is further programmed to reduce or eliminate the undesired optical signals through a multiplicative of the one or more intermediate signals.

6. The optical system of claim 5 where the controller is further programmed to reduce or eliminate the undesired optical signals through a summation of the one or more intermediate signals.

7. The optical system of claim 2 where the controller is further programmed to reduce or eliminate the undesired optical signals through a summation of the one or more intermediate signals.

8. The optical system of claim 1 where the hierarchical phase unwrapping comprises iterative logic that applies a signal correction until a pre-programmed resolution is attained.

9. The optical system of claim 1 where the controller is further programmed to reduce or eliminate the undesired optical signals through a multiplicative of one or more intermediate signals derived from the output of the first optical interferometer, the second optical interferometer, or the third optical interferometer.

10. The optical system of claim 1 where the hierarchical phase unwrapping determines an unambiguous surface profile.

11. The optical system of claim 1 further comprising a wireless transceiver in communication with the electromagnetic detector that transmits the output of the first optical interferometer, the second optical interferometer, and the third optical interferometer at the same rate as the data is received.

12. The optical system of claim 1 where the controller generates a video signal that is transmitted to a remote video display.

13. An optical system comprising:
 a plurality of optical interferometers that generates an interference phenomena between optical waves to measure a plurality of distances, a plurality of thicknesses, and a plurality of indices of refraction of a sample;
 an electromagnetic detector that receives an output of the plurality of the optical interferometer to render a visual image of at least a portion of the sample; and
 a controller programmed reduce or eliminate undesired optical signals through a hierarchical phase unwrapping of the output of the electromagnetic detector by generating a synthetic wavelength based on an output of a separate optical interferometer and render a visual signal of a magnified portion of the sample.

14. The optical system of claim 13 further comprising a wireless transceiver in communication with the electromagnetic detector that transmits the output of the first optical interferometer, the second optical interferometer, and the third optical interferometer at the same rate as the data is received.

15. The optical system of claim 13 where the hierarchical phase unwrapping determines a surface profile of the one or more intermediate synthetic wavelengths.

16. The optical system of claim 15 where at least one of the intermediate synthetic wavelengths is about twice the maximum height variation of the sample.

17. The optical system of claim 13 where the controller is further programmed to reduce or eliminate the undesired optical signals through a multiplicative of one or more intermediate signals.

18. The optical system of claim 13 where the controller is further programmed to function as a non-contact profilometer.

19. A method of imaging a sample comprising:
 enabling a plurality of optical interferometers that generates an interference phenomena between optical waves to measure a plurality of distances, a plurality of thicknesses, and a plurality of indices of refraction of a sample;
 enabling electromagnetic detector that receives an output from the plurality of optical interferometers to render a magnified image of at least a portion of the sample;
 generating a synthetic wavelength from the output based on the output of the plurality of optical interferometers and the output of electromagnetic detector;
 deriving a difference between a characteristic of the synthetic wavelength and an ambiguous surface profile; and
 rendering a corrected ambiguous surface profile that represents a magnified image of the sample.

20. The method of claim 19 further comprising reducing the synthetic wavelength and determining an ambiguous surface profile of the sample.

21. The method of claim 19 further comprising:
 generating a second synthetic wavelength from the output based on the output of the plurality of optical interferometers and the output of electromagnetic detector;
 deriving a second difference between a characteristic of the second synthetic wavelength and a second surface profile; and
 rendering a second corrected surface profile that represents a magnified image of the sample.

* * * * *